(12) United States Patent
Allen et al.

(10) Patent No.: US 8,869,566 B2
(45) Date of Patent: *Oct. 28, 2014

(54) SOOT RADIAL PRESSING FOR OPTICAL FIBER OVERCLADDING

(75) Inventors: Martin Wade Allen, Wilmington, NC (US); Steven Bruce Dawes, Corning, NY (US); Robert Brett Desorcie, Painted Post, NY (US); Nicolas LeBlond, Painted Post, NY (US); Roger A Rose, Painted Post, NY (US); Pushkar Tandon, Painted Post, NY (US); Kochuparambil Vargheese, Horseheads, NY (US); Li Yang, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 217 days.

This patent is subject to a terminal disclaimer.

(21) Appl. No.: 13/217,696

(22) Filed: Aug. 25, 2011

(65) Prior Publication Data

US 2012/0047959 A1    Mar. 1, 2012

Related U.S. Application Data

(60) Provisional application No. 61/377,501, filed on Aug. 27, 2010.

(51) Int. Cl.
*C03B 37/018* (2006.01)
*C03B 37/012* (2006.01)

(52) U.S. Cl.
CPC ............... *C03B 37/01282* (2013.01)
USPC ............................ 65/421; 65/414

(58) Field of Classification Search
USPC .................................. 65/421, 414
See application file for complete search history.

(56) References Cited

U.S. PATENT DOCUMENTS

| | | | |
|---|---|---|---|
| 4,501,601 A * | 2/1985 | Haupt ............................. | 65/399 |
| 5,711,215 A * | 1/1998 | Sextl et al. .................... | 100/211 |
| 2002/0124601 A1* | 9/2002 | Bandyopadhyay et al. .... | 65/390 |
| 2005/0092030 A1* | 5/2005 | Balakrishnan et al. ......... | 65/421 |
| 2005/0262877 A1* | 12/2005 | Balakrishnan et al. ......... | 65/421 |
| 2008/0131066 A1* | 6/2008 | Bickham et al. ............... | 385/125 |
| 2008/0260339 A1* | 10/2008 | Barish et al. ................... | 385/127 |
| 2008/0271495 A1* | 11/2008 | Balakrishnan et al. ......... | 65/421 |
| 2010/0071421 A1 | 3/2010 | Dawes et al. | |
| 2010/0107700 A1 | 5/2010 | Dawes et al. | |

FOREIGN PATENT DOCUMENTS

WO        2010036310 A1    4/2010

* cited by examiner

*Primary Examiner* — Queenie Dehghan
(74) *Attorney, Agent, or Firm* — Robert L. Carlson

(57) ABSTRACT

A method and apparatus for making an optical fiber preform. The apparatus has an outer wall and an inner wall. The outer wall surrounds the inner wall and the inner wall surrounds an inner cavity of the apparatus. A core rod is deposited in the inner cavity after which particulate glass material, such as glass soot, is deposited in the inner cavity around the core rod. The core rod has at least 10 percent of the final cladding soot already applied thereto. A radially inward pressure is applied against the particulate glass material to pressurize the particulate glass material against the core rod.

14 Claims, 7 Drawing Sheets

SOOT RADIAL PRESSING FOR OPTICAL FIBER OVERCLADDING

CROSS-REFERENCE TO RELATED APPLICATIONS

This application claims the benefit of priority under 35 U.S.C. §119 of U.S. Provisional Application Ser. No. 61/377,501, filed on Aug. 27, 2010, the content of which is relied upon and incorporated herein by reference in its entirety.

BACKGROUND OF THE INVENTION

1. Field of the Invention

The present invention relates generally to methods and apparatus for soot radial pressing for optical fiber overcladding, and particularly to methods and apparatus for making optical fiber preforms.

2. Technical Background

Conventional chemical vapor deposition (CVD) processes, such as outside vapor deposition (OVD) and vapor axial deposition (VAD) processes, for making optical fiber preforms often utilize only a portion of the starting raw material due to limitations in the soot throughput and deposition efficiency of the CVD process. Use of alternate methods for making optical fiber preforms using soot therefore is attractive.

Accordingly, different methods have been devised to utilize silica soot in the production of optical fiber preforms. These methods, which include, for example, axial pressing, sol-gel (and other "wet") processes can suffer from a variety of drawbacks including expensive, complicated, and/or time consuming processing conditions and equipment, and may result in preforms with less than desirable properties such as unacceptable variability with respect to preform density and geometry.

SUMMARY OF THE INVENTION

One aspect of the invention is a method for making an optical fiber preform. The method includes placing a partially manufactured optical fiber preform into an inner cavity of an apparatus, the partially manufactured preform comprising a an inner core material which is surrounded by a porous soot region, the porous soot region including a thickness of cladding soot which will result in at least 10 percent of the thickness of the glass cladding in the finished optical fiber. In some embodiments, the porous soot region comprises 15% to 75% of the thickness of the partially manufactured preform, more preferably 15-50%. In some other embodiments, the porous soot region comprises 30% to 100% of the thickness of the partially manufactured preform. Particulate glass material such as, for example, silica soot, doped silica soot, or fumed silica soot material, may be deposited into the inner cavity between the partially manufactured preform and the inner wall, and a radially inward pressure applied against the particulate glass material to pressurize the particulate glass material against the porous soot region on said partially manufactured preform. Silica soot material described here refers to amorphous soot particulate material made of silica or silica doped with dopants such as germania, phosphorus, fluorine, titania, chlorine, and so forth.

In some embodiments, the partially manufactured preform which includes a porous region of soot preferably comprises less than 70 percent, more preferably less than 50 percent, even more preferably less than 30 percent and most preferably less than 25 percent of the thickness of the to be completed optical fiber preform which will ready to be immediately drawn into an optical fiber.

The porous soot region which forms the outer portion of the partially manufactured preform helps in achieving good adhesion of the pressed particulate glass material to the partially manufactured preform. Having this porous soot region as part of the outer portion of the partially manufactured preform mitigates against adhesion issues encountered with pressing particulate glass material directly onto a consolidated glass preform. In some embodiments, we have found that the adhesion between the porous soot region of the partially manufactured preform and pressed particulate glass material is significantly improved by controlling the density of at least the outer portion of the porous soot region to be below 0.6 g/cc.

The apparatus for applying the pressure includes an outer wall and an inner wall, the outer wall surrounding the inner wall and the inner wall surrounding the inner cavity. The particulate silica soot material may be deposited in the inner cavity between partially manufactured preform and the inner wall. The pressure may be applied radially with an inward pressure of from 25 psig to 500 psig, more preferably 100 to 250 psig against the particulate glass material to pressurize the glass material against the partially manufactured perform.

Using the methods disclosed herein, optical fiber preforms have been made wherein the particulate material pressurized against the partially manufactured preform has a density of from 0.6 to 1.2 grams per cubic centimeter and the preform has a largest and smallest diameter along its axial length, wherein the smallest diameter is at least 90% of the largest diameter.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

DETAILED DESCRIPTION OF THE PREFERRED EMBODIMENTS

Figure 1:
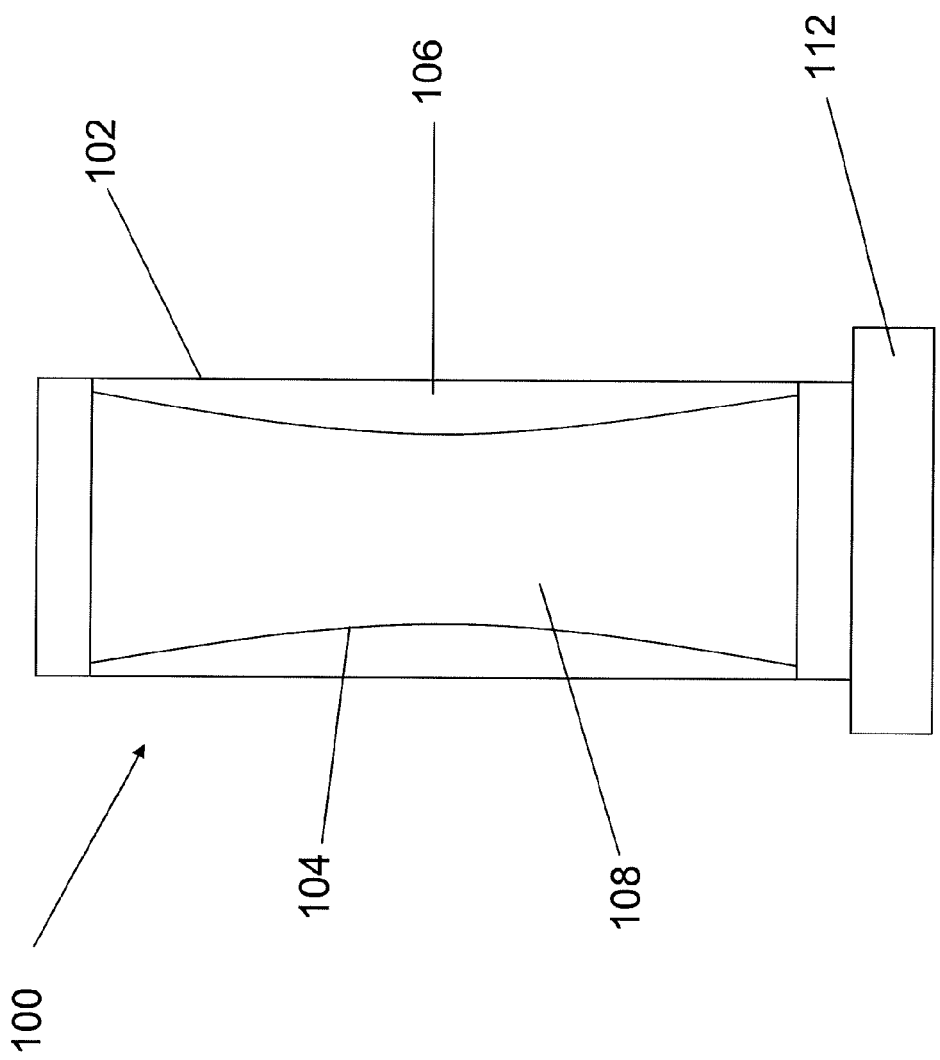
FIG. 1 illustrates a partial cross-sectional side view of an apparatus that can be used in accordance with a preferred method of the present invention wherein the pressure on either side of a flexible inner wall of the apparatus is approximately equal.

Reference will now be made in detail to the present preferred embodiments of the invention, examples of which are illustrated in the accompanying drawings. Whenever possible, the same reference numerals will be used throughout the drawings to refer to the same or like parts.

The present invention relates to methods and apparatus for making an optical fiber preform that include depositing and pressurizing particulate glass material, such as particulate silica soot, around a partially manufactured preform. By partially manufactured preform what is meant is a preform comprised of an inner core region and a partial cladding region, wherein at least the outer partial cladding region is comprised of porous, unconsolidated glass soot. The porous soot region of the partially manufactured preform may be, for example, particulate silica soot that has been deposited via OVD and has not been consolidated to remove the gas that is invariably trapped during the OVD process. The partially manufactured preform thus may be comprised of a porous, unconsolidated soot layer which will become at least a portion of the glass of an optical fiber which will eventually be drawn from a preform using the partially manufactured preform. In some embodiments, the porous soot region comprises 15% to 75%, and in some case 15-50% of the thickness of the partially manufactured preform. In some other embodiments, the porous soot region comprises 30% to 100% of the thickness and in some cases 50-100 percent or even 100 percent of the thickness of the partially manufactured preform.

The method includes placing the partially manufactured preform having the porous soot region into an inner cavity of an apparatus. Particulate glass material may then be deposited into the inner cavity between the partially manufactured preform and the inner wall, and a radially inward pressure applied against the particulate glass material to pressurize the particulate glass material against the porous soot region on said partially manufactured preform. The particulate glass material may be undoped silica, or the particulate glass material may be doped. Potential dopants include at least F, B, Ge, Er, Ti, Al, Li, K, Rb, Cs, Cl, Br, Na, Nd, Bi, Sb, Yb and combinations thereof. The particulate glass material may be pyrogenically generated, for example made be over spray soot from a CVD process (e.g., soot which did not deposit on the mandrel as desired during the deposition process) or otherwise made from soot from using a CVD process ("CVD waste soot"), outside vapor deposition (OVD) process ("OVD waste soot") or vapor axial deposition (VAD) process ("VAD waste soot"), or may be from any other silica source, such as sand, or mixtures of glass soots of different type, or mixtures of sand and silica soot.

The particulate glass material can be untreated (e.g., silica soot or CVD waste soot containing no additional coagulants or solvents) or may be treated with one or more coagulants or solvents, such as water or an organic solvent. In preferred embodiments, the particulate silica soot material is untreated. Preferably, the particulate silica soot material has an average tap density of from 0.1 to 1.0 grams per cubic centimeter, even more preferably of from 0.1 to 0.5 grams per cubic centimeter, such as from 0.2 to 0.4 grams per cubic centimeter, including about 0.3 grams per cubic centimeter.

Reference will now be made to FIGS. 1-6, which illustrate a preferred method and apparatus in accordance with the invention. FIG. 1 shows a partial cross-sectional side view of an apparatus that can be used in accordance with embodiments of the present invention. Apparatus 100 includes a cylindrical rigid outer wall 102 and a flexible inner wall 104, wherein the flexible inner wall 104 surrounds an inner cavity 108 of the apparatus and the area between the rigid outer wall 102 and flexible inner wall 104 defines an annular cavity 106. By "rigid" we mean rigid as compared to the flexible inner wall 104 and by "flexible" we mean flexible as compared to the rigid outer wall 102. In the embodiment shown in FIG. 1, the pressure on either side of the flexible inner wall 104 is approximately equal, that is the pressure in the annular cavity 106 is approximately equal to the pressure in the inner cavity 108. Apparatus 100 further includes a top end cap 110 (shown in FIGS. 5 and 6) and a bottom end cap 112. Top end cap 110 and bottom end cap 112 each preferably include a centerline hole (not shown) for receiving and centering a partially manufactured preform. Top end cap 110 and bottom end cap 112 each preferably provide a pressure seal at the top and bottom of annular cavity 106 and also each preferably allow excess air in the inner cavity 108 to escape via the centerline hole. Preferred materials for end caps include metals, such as aluminum or steel, or plastics.

Cylindrical rigid outer wall 102 can be made of any material that has the mechanical strength to withstand, without appreciable deformation, the maximum normal operating pressures in the annular cavity 106. In a preferred embodiment, cylindrical rigid outer wall 102 is made of aluminum. Other preferred materials for cylindrical rigid outer wall 102 include, for example, other metals like stainless steel or plastics. In a preferred embodiment, cylindrical rigid outer wall 102 has a substantially uniform diameter along its axial length. In alternative preferred embodiment, cylindrical rigid outer wall 102 has a diameter that varies slightly along its axial length to counter pressure differences that may exist at the top and bottom of the apparatus 100. Cylindrical rigid outer wall 102 may comprise a uniform cylindrical piece or it may comprise two or more cylindrical segments attached end to end.

Flexible inner wall 104 can be made of any material that has sufficient elasticity and yield strength to elastically deform radially inwards without suffering plastic deformation when subjected to the maximum normal operating pressures in the annular cavity 106. In a preferred embodiment, flexible inner wall 104 is a tube made of a latex material, such as standard elastomeric latex tubing available from Piercan USA, Inc. Other preferred materials for flexible inner wall 104 include, for example, Neoprene, Buna-N, polyurethane, or silicone rubber. Preferably, flexible inner wall 104 has a tensile strength of 95 to 7,000 psi and an elongation of 200% to 800%. In a preferred embodiment, flexible inner wall 104 is sealed to cylindrical rigid outer wall 102. In an alternative embodiment, flexible inner wall 104 can comprise a toroidal bladder fitted into the cylindrical rigid outer wall 102. In such an embodiment, a seal between the toroidal bladder and the cylindrical rigid outer wall 102 is not necessary.

Figure 2:
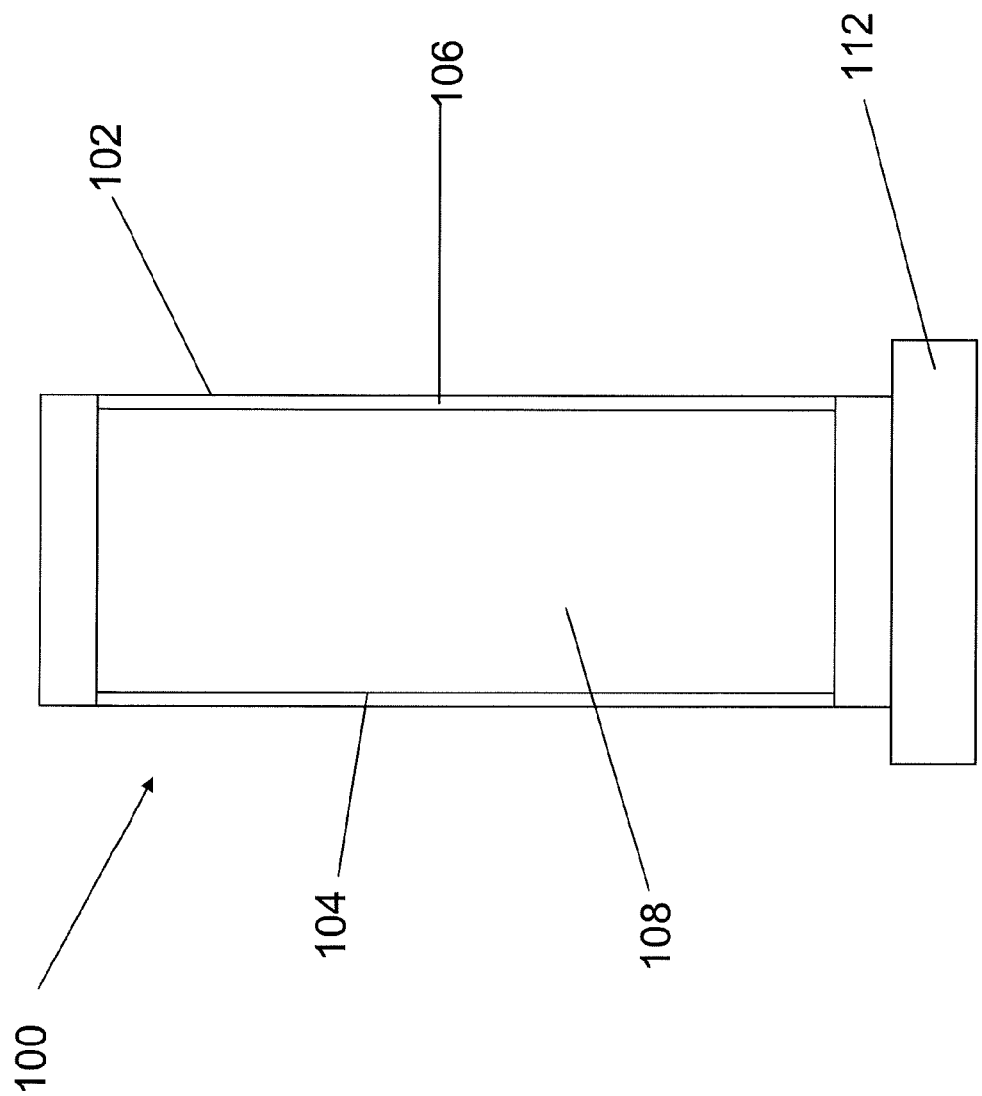
FIG. 2 illustrates a partial cross-sectional side view of an apparatus that can be used in accordance with a preferred method of the present invention wherein the air between a flexible inner wall and a rigid outer wall of the apparatus has been mostly removed.

As shown in FIG. 2, annular cavity 106 can be depressurized such that air or other fluid has been mostly or nearly completely removed from annular cavity 106. As a result of such depressurization, flexible inner wall 104 elastically deforms radially outwardly such that, as shown in FIG. 2, the maximum outer diameter of flexible inner wall 104 is nearly equal to the inner diameter of rigid outer wall 102. Meanwhile, the volume of annular cavity 106 is decreased while the volume of inner cavity 108 is increased.

Figure 3:
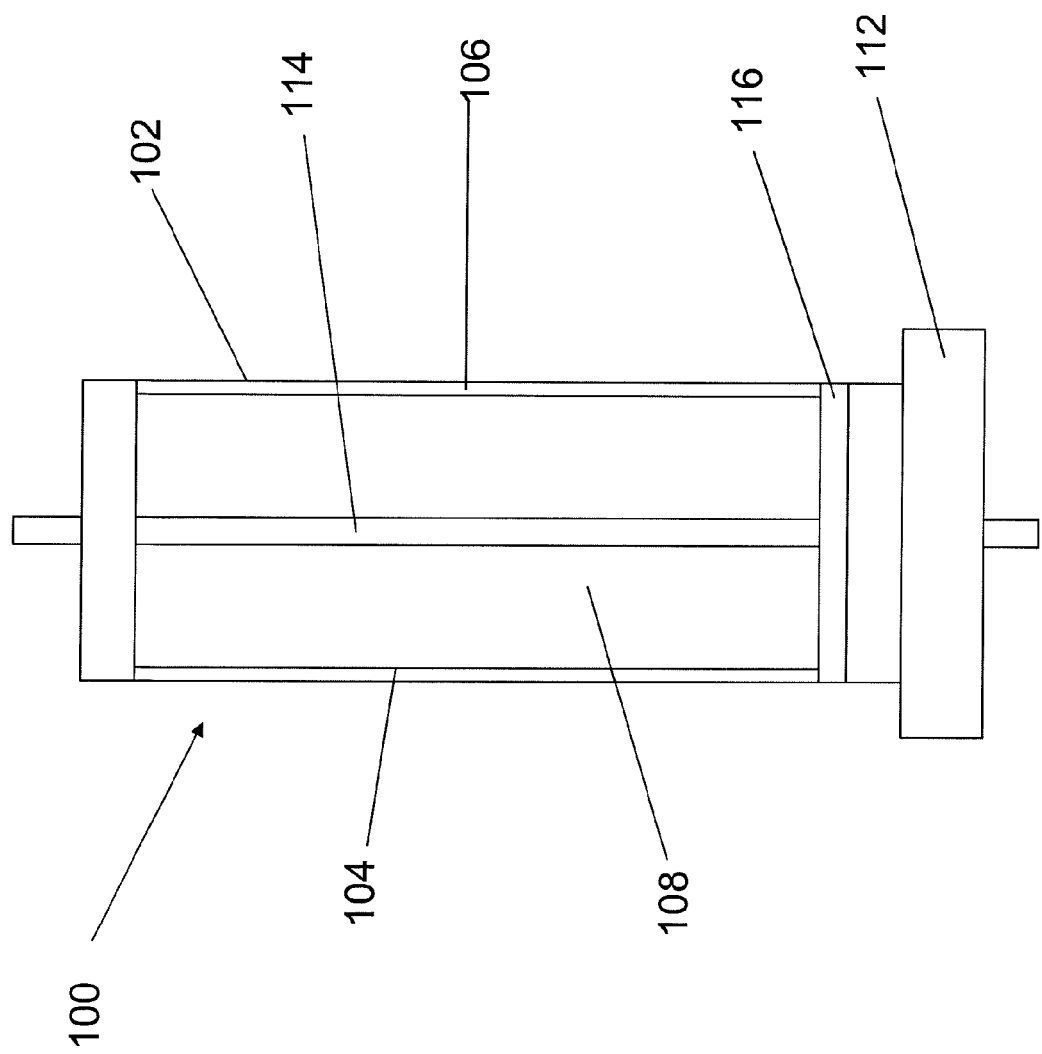
FIG. 3 illustrates a partial cross-sectional side view of an apparatus that can be used in accordance with a preferred method of the present invention wherein a partially manufactured preform is centered within an inner cavity of the apparatus.

As shown in FIG. 3, a partially manufactured preform 114 may be placed and centered in inner cavity 108 of apparatus 100. As shown in FIG. 3, annular cavity 106 is depressurized as in FIG. 2. Partially manufactured preform 114 can extend through inner cavity 108 as well as through centerline hole (not shown) in bottom end cap 112 such that top and bottom portions of partially manufactured preform 114 extend out of apparatus 100. A plug 116 made of, for example, foam rubber may be placed at the bottom of inner cavity 108. Plug 116 has a centerline hole (not shown) for receiving partially manufactured preform 114. Plug 116 preferably has a diameter that is about the same as the inner diameter of rigid outer wall 102 and centerline hole of plug 116 preferably has a diameter that is about the same or slightly smaller than the diameter of partially manufactured preform 114 such that plug 116 fits snugly at the bottom of inner cavity 108 and around partially manufactured preform 114. The plug preferably fits inside of the bladder. Plug 116 can serve to prevent loose soot from escaping through the bottom of the apparatus and can further serve to impart rounded or tapered ends to the pressed soot body.

Figure 4:
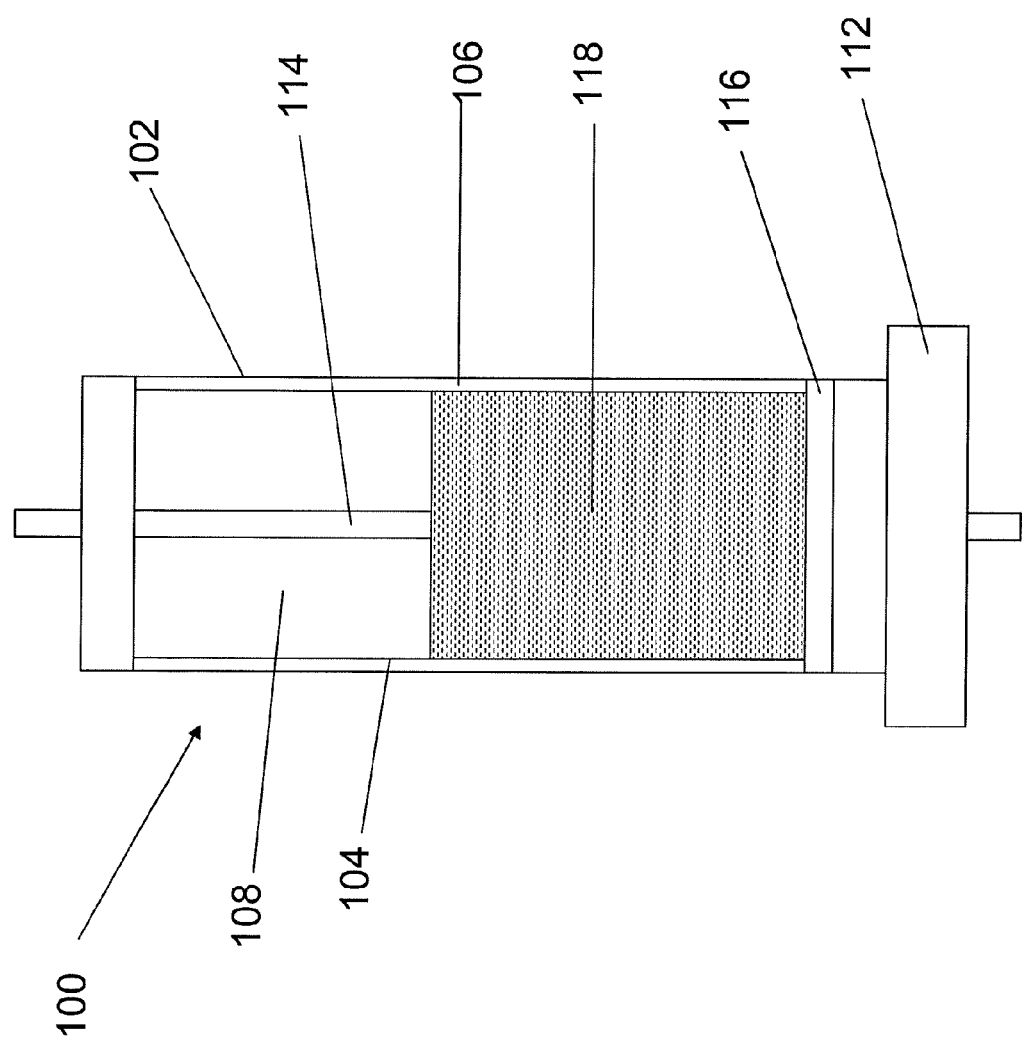
FIG. 4 illustrates a partial cross-sectional side view of an apparatus that can be used in accordance with a preferred method of the present invention wherein glass soot is deposited in the inner cavity between the partially manufactured preform and the flexible inner wall.

As shown in FIG. 4, particulate soot material, such as silica soot 118, can be deposited or poured through the top of apparatus 100 into inner cavity 108 between partially manufactured preform 114 and flexible inner wall 104. In some embodiments, the particulate glass material which is inserted in the inner cavity between the partially manufactured preform and the inner wall makes up the remainder of the material which will form the outer portion of the optical fiber preform and the optical fiber which is drawn therefrom. As shown in FIG. 4, annular cavity 106 is depressurized as in FIG. 2. While FIG. 4 shows inner cavity 108 approximately half filled with silica soot 118, in preferred embodiments, silica soot is deposited or poured into inner cavity 108 until inner cavity 108 is nearly full. Following the depositing or pouring of silica soot 118 into inner cavity 108, an additional plug (not shown) may be placed above silica soot 118 and around partially manufactured preform 114 near the top of inner cavity 108. Preferably, inner cavity 108 is depressurized following deposition of silica soot 118 into inner cavity. Partially manufactured preform 114 preferably comprises core region which is surrounded by a porous layer of soot, the porous layer of soot comprising a thickness which will result in at least 25 percent of the thickness of the glass in the partially manufactured optical fiber preform. In some embodiments, the porous soot region comprises 15% to 75%, and in some case 15 to 50% of the thickness of the partially manufactured preform. In certain other embodiments, the porous soot region comprises 30% to 100%, 50 to 100%, 80 to 100%, or even 100% of the thickness of the partially manufactured preform. In some preferred embodiments, the partially manufactured preform which includes a porous region of soot preferably comprises less than 70 percent, more preferably less than 50 percent, even more preferably less than 30 percent and most preferably less than 25 percent of the glass in the finished optical fiber preform. By radially pressing the glass soot 118 onto the OVD deposited porous soot region of the partially manufactured preform, rather than directly onto a preform having an outer glass region comprised of consolidated glass, soot adhesion issues at the interface are eliminated and preform integrity is maintained during consolidation of the preform and drawing of the consolidated preform into an optical fiber.

Figure 5:
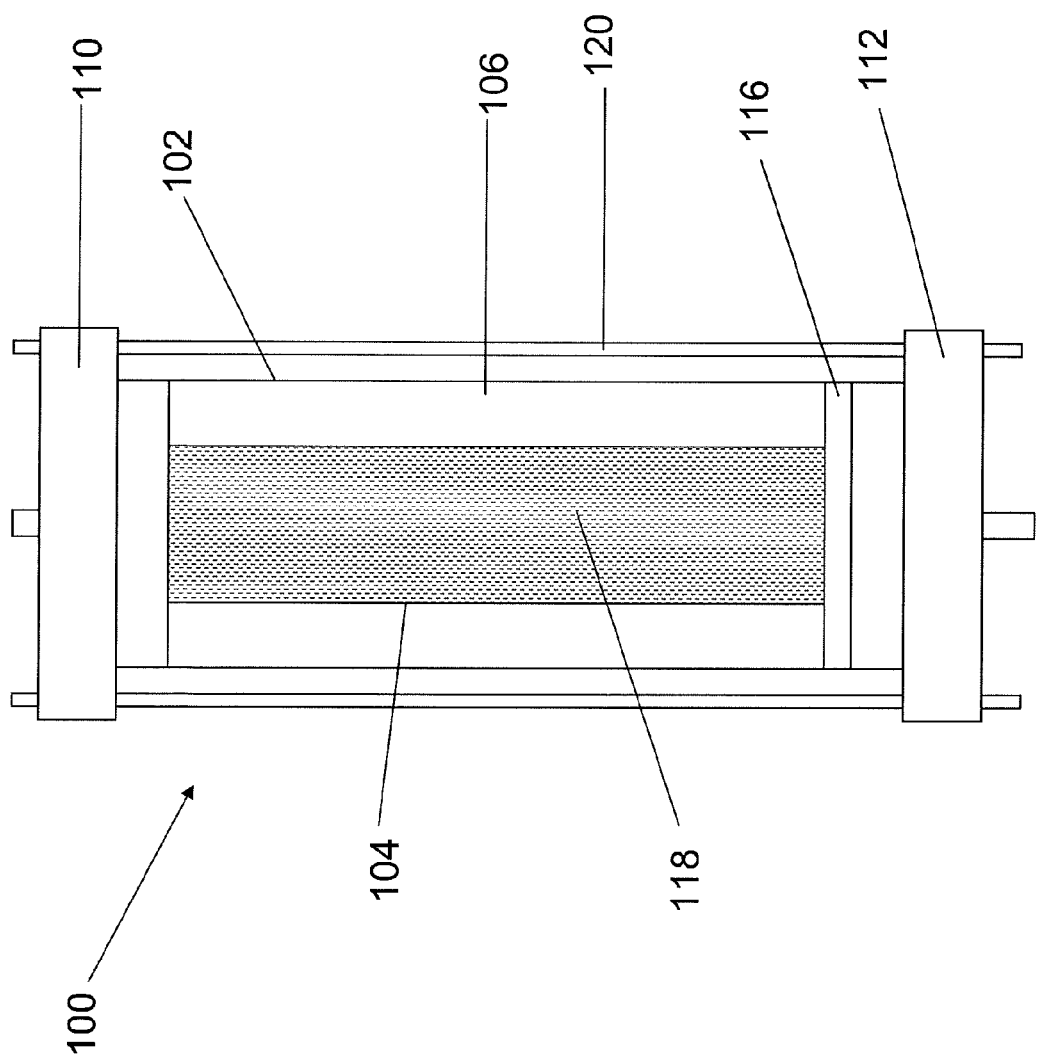
FIG. 5 illustrates a partial cross-sectional side view of an apparatus that can be used in accordance with a preferred method of the present invention wherein the glass soot is pressurized by providing a pressurized fluid between the rigid outer wall and the flexible inner wall.

As shown in FIG. 5, the particulate silica soot 118 deposited in inner cavity 108 is pressurized by providing a pressurized fluid in annular cavity 106 between rigid outer wall 102 and flexible inner wall 104.

In preferred embodiments, top end cap 110 is placed into position and connected to bottom end cap 112 using threaded rods 120. Next, fluid can be gradually introduced into annular cavity 106 such that the pressure in annular cavity gradually increases from negative to positive pressure as compared to atmospheric pressure. Preferably, the pressure in annular cavity 106 is increased at a rate of less than 50 psi/min, and even more preferably at a rate of less than 20 psi/min, such as from 2 to 20 psi/min and further such as from 5 to 15 psi/min. As the pressure of the pressurized fluid in annular cavity 106 gradually increases to increasingly higher positive gauge pressures, flexible inner wall 104 elastically deforms radially inwardly against silica soot 118 (causing the volume of annular cavity 106 to gradually increase and the volume of inner cavity 108 to gradually decrease) and glass soot 118 is pressed radially inwardly toward partially manufactured preform 114. Preferably, the pressure of the pressurized fluid in annular cavity 106 is increased until it reaches a maximum predetermined value. The pressure may or may not be held at this value for a predetermined amount of time. When held for a predetermined amount of time, the pressure may, for example, be held for at least 1 minute, such as from 1 minute to 200 minutes, preferably 30 to 120 minutes.

In preferred embodiments, during the step of pressuring the silica soot, the pressurized fluid has a maximum pressure of from 25 psig to 500 psig, such as from 100 to 250 psig. Examples of pressurized fluid include air, inert gases (e.g., nitrogen), water, and oil. A particularly preferred pressurized fluid is air. In preferred embodiments, during the step of pressurizing the glass soot, the temperature of the inner cavity 108 is less than 50° C., such as from 20° C. to 40° C., and even more preferably, room temperature (i.e., between 20° C. and 25° C.).

Figure 6:
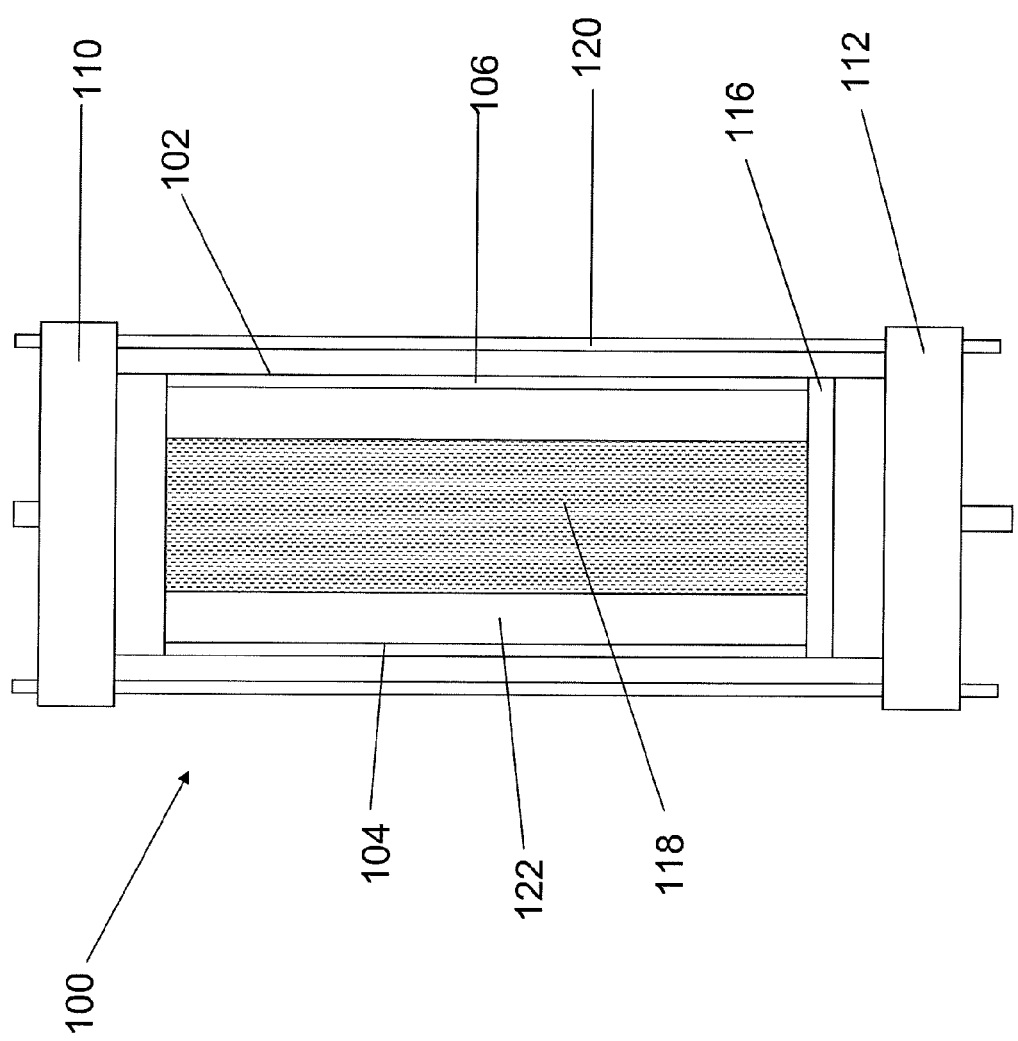
FIG. 6 illustrates a partial cross-sectional side view of an apparatus that can be used in accordance with a preferred method of the present invention wherein pressurized fluid is mostly removed from between the rigid outer wall and the flexible inner wall.

After the soot has been pressed sufficiently, as shown in FIG. 6 the pressurized fluid in annular cavity 106 may be released such that annular cavity 106 is depressurized as in FIG. 2 (such that the pressure in annular cavity 106 is less than the pressure in inner cavity 108). Preferably, the pressure in annular cavity 106 is decreased at a rate of less than 50 psi/min, and even more preferably at a rate of less than 20 psi/min, such as from 2 to 20 psi/min and further such as from 5 to 15 psi/min. As the pressure in annular cavity 106 gradually decreases, flexible inner wall 104 deforms radially outwardly away from pressed glass soot 118 (causing the volume of annular cavity 106 to gradually decrease and the volume of inner cavity 108 to gradually increase) such that an annular gap 122 is present in inner cavity 108 between the outer diameter of pressed particulate silica soot 118 and flexible inner wall 104.

Figure 7:
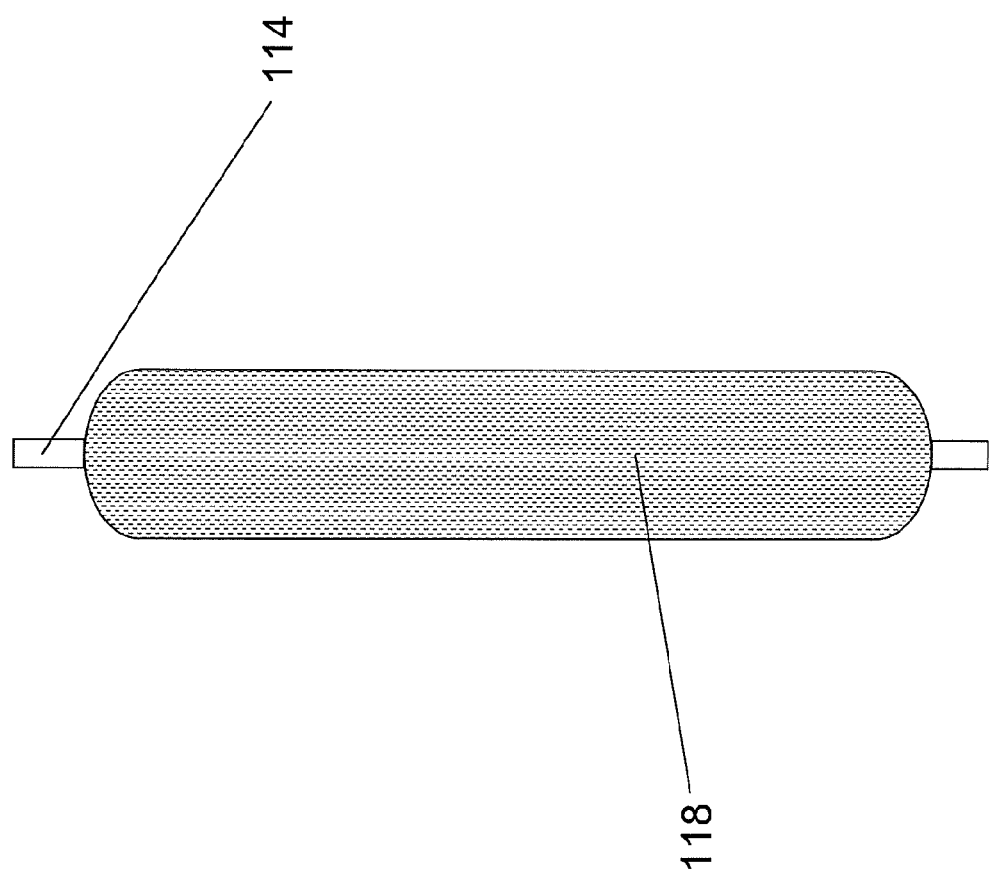
FIG. 7 illustrates a partial cross-sectional side view of a pressed soot/partially manufactured preform assembly that is removed from the apparatus and is ready for cleaning and consolidation.

Following depressurization of annular cavity 106, partially manufactured preform/pressed soot assembly or porous preform (an example of which is shown in FIG. 7) is ready to be removed from apparatus for cleaning and consolidation.

In preferred embodiments, porous preforms can be provided in which the particulate silica soot material pressurized against the partially manufactured preform has a final pressed density of at least 0.5 grams per cubic centimeter, such as from 0.6 to 1.2 grams per cubic centimeter, and further such as from 0.8 to 1.0 grams per cubic centimeter, including about 0.9 grams per cubic centimeter. The density of the particulate glass material pressurized against the partially manufactured preform is largely a function of the maximum pressure applied during the step of pressurizing the particulate silica soot material. Generally, the greater maximum pressure applied during the step of pressurizing the particulate silica soot material, the greater the density of that material and, hence, the greater the overall density of the porous preform. Using methods disclosed herein, porous preforms having a density of at least 0.6 grams per cubic centimeter can be produced using maximum pressures of at least 50 psig, porous preforms having a density of at least 0.7 grams per cubic centimeter can be produced using maximum pressures of at least 100 psig, porous preforms having a density prior to consolidation of at least 0.8 grams per cubic centimeter can be produced using maximum pressures of at least 150 psig, and porous preforms having a density of at least 0.9 grams per cubic centimeter can be produced using maximum pressures of at least 200 psig.

When the portion of the overclad is formed by pressing of the soot onto the partially manufactured preform, the porous soot surface of the partially manufactured preform helps in promoting good adhesion of the pressed soot layer to the partially manufactured preform. Having the porous soot layer as part of the partially manufactured preform mitigates against adhesion issues encountered with pressing soot directly onto a partially manufactured preform having an outer glass region which is consolidated glass. In certain other embodiments, we have found that the adhesion between the deposited soot and pressed soot is significantly improved by controlling the density in the porous soot layer region of the partially manufactured preform to be less than 0.6 grams per cubic centimeter.

In preferred embodiments, the porous preform has a substantially uniform diameter in the axial direction. Preferably, the smallest diameter of the preform along its axial length is at least 90% of its largest diameter along its axial length. Even more preferably, the smallest diameter of the preform along its axial length is at least 95% of its largest diameter along its axial length.

Porous preforms made in accordance with embodiments disclosed herein are capable of being consolidated into a glass blank using standard consolidation equipment and processes and then drawn into optical fiber using standard drawing equipment and processes. Preferably, the pressed soot surrounding the porous preform will eventually form glass once the porous preform is consolidated and drawn into an optical fiber, such that at least 35%, and further such as at least 40%, and even further such as at least 50% of the total mass of the glass is derived from the pressed soot. When consolidated into a glass blank, porous preforms made in accordance with embodiments disclosed herein can preferably provide a consolidated blank wherein the smallest ratio of partially manufactured preform to the outer diameter of the cladding is at least 98% of the largest ratio of the outer diameter of the partially manufactured preform to the outer diameter of the cladding along the axial length of the blank.

The invention will be further clarified by the following example.

Example 1

An optical fiber preform was made using an apparatus having a rigid cylindrical outer wall and a flexible inner wall. The rigid cylindrical outer wall was made of steel having an inner diameter of 6 inches, a length of 46 inches, and a wall thickness of ½ inch. The flexible inner wall was a urethane rubber tube having a diameter of about 4.25 inches in the unstressed state. The top and bottom ends of the urethane rubber tube were clamped to the top and bottom ends of the steel cylinder. The apparatus further included top and bottom aluminum end caps, each end cap having a thickness of about 1 inch, a center hole to accommodate a partially manufactured preform and four peripheral holes for accommodating threaded rods. The air between the flexible inner wall and rigid outer wall was substantially removed so that the outside diameter of the flexible inner wall was essentially the same as the inside diameter of the rigid outer wall. An eight inches foam plug with approximately the same diameter as the inside diameter of the rigid cylinder was inserted into the cavity so that it was flush with the bottom of the cylinder. The bottom of the cylinder was then sealed with an aluminum end-cap and a Viton o-ring.

A fully consolidated glass cane 15 mm in diameter and 1 m in length was used as the core material and 3000 grams of silica soot was deposited onto the consolidated glass core cane using the OVD deposition process. Soot density of the deposited soot was 0.65 gm/cc. This resulted in a 1 m soot partially manufactured preform that was about 80 mm in diameter. This partially manufactured preform was then loaded into a mold for the soot pressing step. The partially manufactured preform was centered and the mold was filled with about 3000 gm of loose particulate silica soot. The loose soot consisted of silica particles that had a tap density of ~0.30 gm/cc. A six inch foam plug with approximately the same diameter as the inside diameter of the rigid cylinder was inserted into the cavity and inside the urethane bladder so that it was flush with the top of the cylinder. The top of the cylinder was then sealed with an aluminum end-cap and a Viton o-ring and the pressing process was started. The urethane bladder compressed the soot under isostatic pressure. The pressure was gradually ramped from 0-150 psi, then held at 150 psi for 60 min. The pressure was then gradually released until the pressure was 0 psi. The pressed layer density was about 0.8 g m/cc, uniform radially, and resulted in a final pressed soot preform that was 88 cm in length and about 105 mm in diameter, with approximately 50 percent of the mass from pressed soot. The assembly was then processed in the following manner to make a glass blank for drawing into optical fiber. It was loaded into a multizone consolidation furnace and heated to 1100° C. This was followed by downdriving at 6 mm/min (corresponding to heat up rate of 3° C./min) through a hot zone set at 1500° C. in a helium atmosphere in order to sinter the deposited soot and pressed soot to void free glass. The blank formed in this manner was then drawn into optical fiber of 125 micron diameter for its use in transmission systems.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method for making an optical fiber preform for making an optical fiber comprising the steps of:
   providing an apparatus, the apparatus including an inner cavity and an inner wall, the inner wall surrounding the inner cavity;

placing a partially manufactured preform into an inner cavity of an apparatus, the partially manufactured preform comprising inner core material which is surrounded by a porous soot region, the porous soot region including cladding soot which will result in at least 10 percent of the thickness of the glass cladding in the finished optical fiber, and the porous soot region comprises soot deposited by chemical vapor deposition;

depositing particulate glass material in the inner cavity between the partially manufactured preform and the inner wall of said inner cavity; and applying a radially inward pressure against the particulate glass material to pressurize the particulate glass material against the porous layer of soot on the partially manufactured preform.

2. The method of claim 1, wherein the porous soot region comprises a thickness which will result in less than 70 percent of the thickness of the glass in the finished optical fiber preform.

3. The method of claim 1, wherein the porous soot region comprises a thickness which will result in less than 30 percent of the thickness of the glass in the finished optical fiber preform.

4. The method of claim 1, wherein the apparatus comprises an outer wall, the outer wall surrounding the inner wall.

5. The method of claim 4, wherein the step of applying a radially inward pressure comprises providing a pressurized fluid between the outer wall and the inner wall.

6. The method of claim 1, wherein the particulate glass material in the inner cavity between the partially manufactured preform and the inner wall makes up the remainder of the material which will form the outer portion of the optical fiber.

7. The method of claim 1, wherein said applying a radially inward pressure step comprises applying from 25 psig to about 500 psig.

8. The method of claim 1, where the porous soot region comprises 15% to 75% of the total thickness of the partially manufactured preform.

9. The method of claim 1, wherein prior to the step of applying a radially inward pressure against the particulate glass material, the particulate glass material has an average bulk density of from 0.1 to 0.5 grams per cubic centimeter.

10. The method of claim 1, wherein the particulate glass material is particulate soot from a CVD process.

11. The method of claim 1, wherein the density in at least the outer portion of the porous soot region comprises a density below 0.6 g/cc.

12. A method for making an optical fiber preform for making an optical fiber comprising the steps of:

providing an apparatus, the apparatus including an inner cavity and an inner wall, the inner wall surrounding the inner cavity;

placing a partially manufactured preform into the inner cavity, the partially manufactured preform comprising an inner core material which is surrounded by a porous soot region, the porous soot region comprising a thickness which will result in more than 40 percent of the thickness of the glass cladding in the finished optical fiber preform, less than 100% of the total thickness of the partially manufactured preform, said porous soot region comprising soot deposited by chemical vapor deposition;

depositing particulate glass material in the inner cavity between the partially manufactured preform and the inner wall; and applying a radially inward pressure against the particulate glass material to pressurize the particulate glass material against the porous lager of soot on the partially manufactured preform to form a preform.

13. The method of claim 12, wherein the porous soot region comprises 15 to 50% of the total thickness of the partially manufactured preform.

14. The method of claim 12, wherein the partially manufactured preform comprises 50 percent or less of the glass in the finished optical fiber preform.

* * * * *